Aug. 18, 1931.  J. H. OLSON  1,819,788
BRAKING MECHANISM
Filed Oct. 22, 1927  6 Sheets-Sheet 1

Fig.1.

INVENTOR
JOHAN H. OLSON
BY
*J S Wooster*
ATTORNEY

Aug. 18, 1931. J. H. OLSON 1,819,788
BRAKING MECHANISM
Filed Oct. 22, 1927 6 Sheets-Sheet 5

INVENTOR
JOHAN H. OLSON
BY
*J S Wooster*
ATTORNEY

Patented Aug. 18, 1931

1,819,788

UNITED STATES PATENT OFFICE

JOHAN HJALMAR OLSON, OF LARCHMONT, NEW YORK, ASSIGNOR TO M. H. TREADWELL COMPANY, A CORPORATION OF NEW YORK

BRAKING MECHANISM

Application filed October 22, 1927. Serial No. 227,943.

This invention relates to a braking mechanism for cars having a plurality of trucks, such as hot metal dumping cars, whereby when the means normally operated to simultaneously apply the brakes of all the trucks proves insufficient, additional means can be operated to apply them, regardless of the operative condition of the first means.

The invention is primarily intended for large capacity hot metal cars, which may weigh when empty up to 125 tons, and which may in addition carry 125 to 175 tons of hot metal. Such cars have to be generally constructed according to M. C. B. standards, and I. C. C. regulations, because used in intrastate or interstate transportation on common carriers. Such large cars and weights therefore require special braking facilities not required ordinarily.

The usual arrangement is to operate the brakes from one end of the car by suitable air brake mechanism and to provide hand mechanism, also at this end, to set the brakes if it is not desired to employ the air pressure mechanism. If the brake shoes have become worn, the air brake piston may move to the end of its stroke without sufficiently setting the brakes to stop the car as soon as desired. When this occurs, the hand brake attached to the same system of levers as the air brake mechanism may not be able to further apply the brakes. Heretofore to remedy this defect it has been necessary to readjust the brake rigging or readjust or renew the brake shoes.

In accordance with the present invention, I have developed a system of levers associated with the braking elements of the several trucks of a car, and with independent operative means, so that although the air brake mechanism may be ineffective, an independent manual operating means can be moved while the car is in motion to further apply the brakes regardless of the operative position or condition of the air brake mechanism and its associated hand operated apparatus.

I shall illustrate the invention in connection with its application to a hot metal dumping car having two trucks each of which is provided with braking elements suspended from the respective trucks. My improved system includes a pair of horizontal floating levers one of which is located at the horizontal center of each truck. One end of each floating lever is connected to the braking elements of its own truck, while the other ends of the levers are connected together by a pull rod which extends longitudinally between the two trucks. The fulcrum of one floating lever is connected to the air brake and usual hand brake at one point on the car, while the fulcrum of the other floating lever is connected to a second hand brake at another point on the car. Stop mechanisms are provided so that in their normal position the fulcra of the floating levers can only be moved in one direction, preferably in opposite directions with respect to each other.

When the fulcrum of one floating lever is moved by its associated air or hand control it not only applies the brakes on its own truck, but also exerts a pull on the pull rod, causing the floating lever on the second truck to pivot about its fulcrum in a direction to apply the brakes which are connected to said lever without, however, displacing said fulcrum. After all the brakes have been applied by thus moving the fulcrum of the first lever, they can be further applied by moving the fulcrum of the second lever by operating the air or hand control which is connected thereto. This movement not only results in further applying the brakes connected to the second lever, but also causes the pull rod to pivot the first lever about its fulcrum so as to further apply the brakes on the first truck.

Since the two trucks of the car are independent, they will turn at an angle to each other when the car swings around a curve. The centers of the two trucks, however, will always remain the same distance apart, although the distance between any other given points on the trucks will vary according to the particular curve which is being negotiated. Consequently, no matter how the trucks may turn in going around a curve, the turning movement will never tighten the pull rod which connects the floating levers in a manner to apply the brakes. The floating levers need not be located in the exact centers of the respective trucks, since a slight tension on the pull rod while negotiating a curve will do no harm so long as the tension is insufficient under any condition to set the brakes.

In the preferred form of the invention the length of the pull rod is somewhat greater than the normal distance between the fulcra of the floating levers. This gives a greater leverage between the floating levers and the pull rod, and facilitates operation of the brakes even when the brake shoes are worn down considerably.

A preferred form of the invention is illustrated in the drawings of which,

Fig. 5 is a vertical longitudinal section taken on the line 5—5 of Fig. 4;

Figure 1:
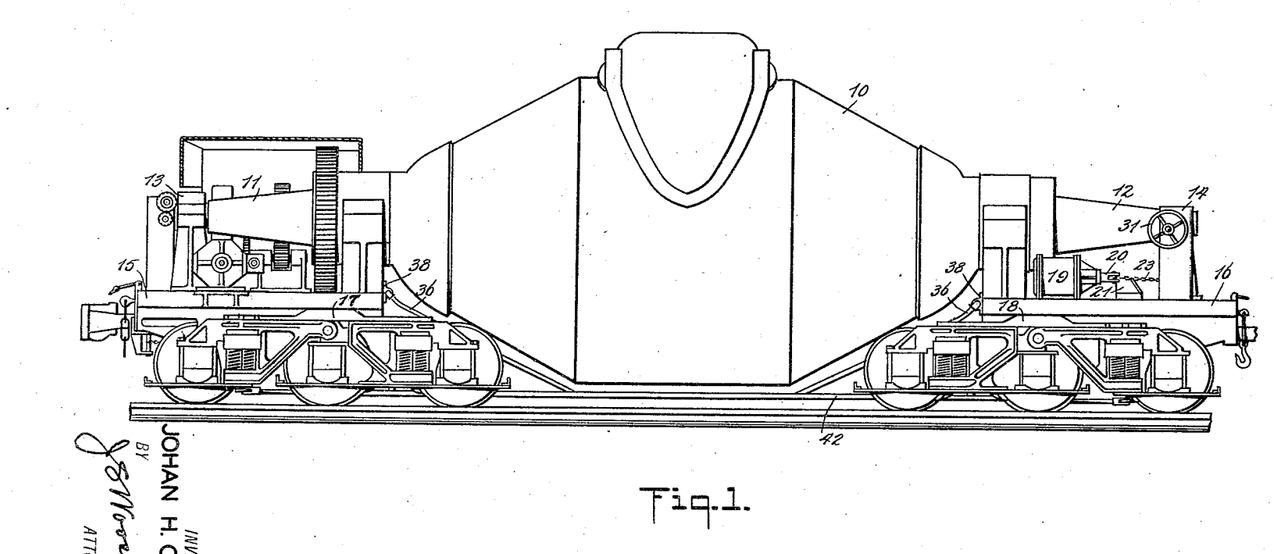
Fig. 1 is a side elevation, partly in section, of a hot metal dumping car of the type to which my invention is applied.

The apparatus described is applied to a hot metal dumping car of the type generally disclosed and described in U. S. Patent 1,489,688, April 8, 1924, C. P. Astrom. This car comprises a hot metal dumping body 10, having elongated end trunnions 11 and 12, supported in bearings which are part of truck platforms 15 and 16 and in trunnion pedestals 13 and 14 mounted on truck platforms 15 and 16. These bearings and pedestals are rotatably supported in any desired manner on bolsters 17 and 18.

This car is ordinarily adapted to be braked by an air brake apparatus comprising a brake cylinder 19, having a piston 20, connected to a lever 21, connected to a vertical shaft 22 extending downwards through the truck platform 16. A chain 23 is connected to the end of lever 21 and is adapted to be wrapped around a vertical shaft 24 mounted in a stand on truck frame 16. This shaft is provided with a worm gear 25, operated by a worm 26 on shaft 27, one end of which carries gear 28 meshing with gear 29 on shaft 30, the other end of which is provided with a hand wheel 31. The shaft 27 is provided with a ratchet gear 27a and a pawl 27b to prevent rotation of the shaft in one direction. The operation of the hand wheel 31 will, through the chain 23, operate the lever 21 when desired. This lever 21 is, as will hereinafter be described, connected to the system of levers forming part of the braking mechanism. Therefore, at one end of the car the brakes may be set either by air mechanism or by hand.

Figure 4:
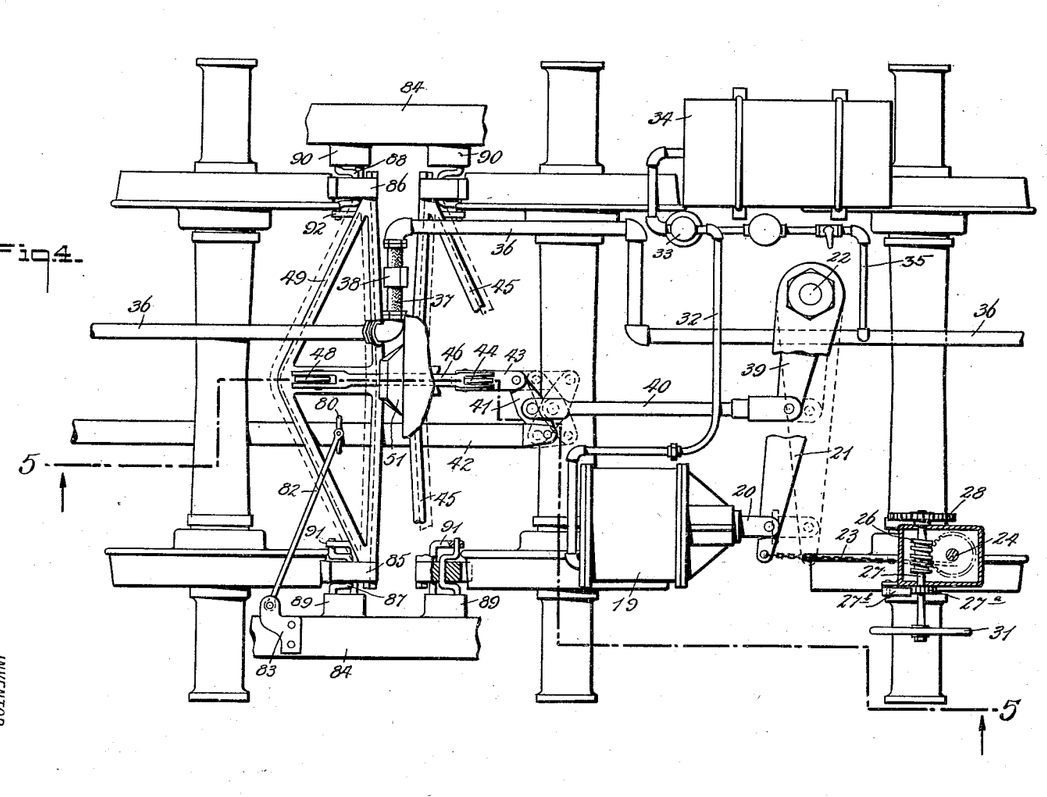
Fig. 4 is an enlarged plan view of one truck of the car with certain portions in section showing the braking mechanism.

The brake cylinder is attached to truck platform 16 and supplied with air through pipe 32, triple valve 33 from a reservoir 34 which through the triple valve and pipe 35 is connected to the train line 36 leading to the control valve in the engineer's cab, or any other suitable location. The air brake system, as shown in Fig. 4, connects to a train line 36 and in this line are located flexible connections 37 supported from the end of the truck platforms 15 and 16 by means of brackets 38, see Figs. 4 and 5. This will permit considerable relative movement between the trucks and the cars without damaging the air line.

The lever 21 is connected to the shaft 22, the lower end of which supports an arm 39, connected to a bar 40, the other end of which is connected to an intermediate portion of a horizontal floating lever 41 which is preferably located at the center of the truck. One end of this floating lever is connected to a pull rod 42 extending forwardly to the other truck and connected to a braking mechanism to be hereinafter described. The other end of the floating lever 41 is connected to a link 43, connected to the lower end of a rocking arm 44, pivoted on the brake beam 45, and the other end of the rocker arm 44 is connected to a strut 46, the other end of which is provided with a plurality of holes 47, whereby it may be adjustably connected to another rocker arm 48 pivoted to the brake beam 49. The other end of the rocker arm 48 is connected to a link 50 which in turn is connected to the lower end of a dead end post 51, fixed to or part of truck bolster 18.

Figure 2:
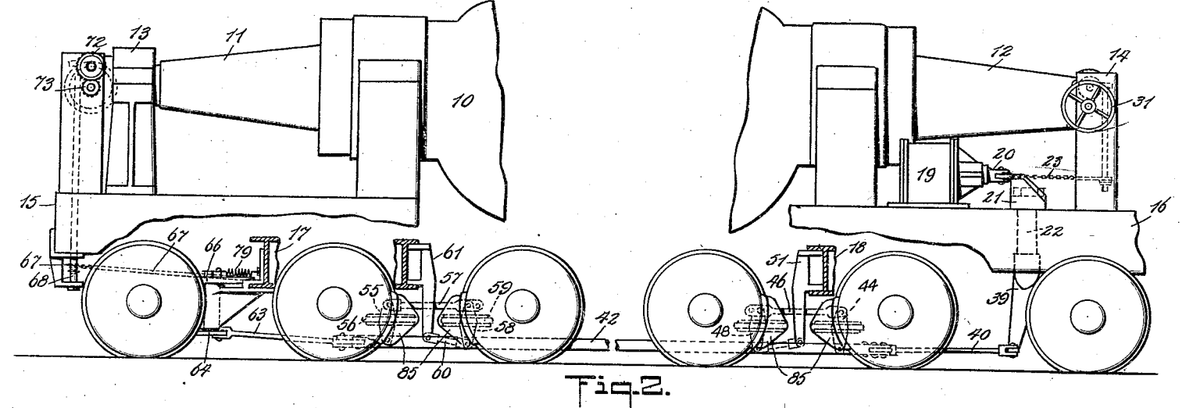
Fig. 2 is an enlarged partial elevation with portions broken away and in section showing the braking mechanism.
Figure 3:
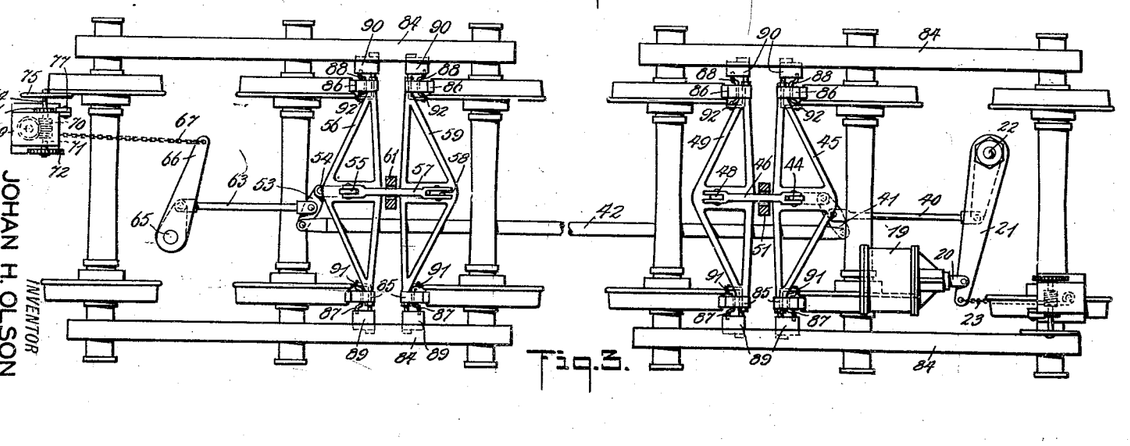
Fig. 3 is a plan view of the apparatus shown in Fig. 2.

The pull rod 42, above mentioned, at its other end beneath the truck bolster 17 is connected to one end of a second horizontal floating lever 53 which in turn is connected at its other end to link 54 connected to rocker arm 55, pivotally mounted on brake beam 56. The floating lever 53 is preferably located at the center of its truck, as shown in Figs. 2 and 3. A strut 57 connects rocker arm 55 and adjustable with another rocker arm 58, pivotally mounted on the brake beam 59. The lower end of rocker arm 58 is connected to a link 60 connected to the lower end of a dead end post 61, fixed to or part of truck bolster 17. An intermediate portion of the floating lever 53 is connected to a rod 63, the other end of which is connected to an arm 64 fastened to the lower end of a shaft 65 anchored in bracket 78, the upper end of shaft 65 supporting a lever 66, to the outer end of which a chain 67 is connected. This chain extends to and is adapted to be wrapped around a vertical shaft 68, the upper end of which carries a worm gear 69, meshing with a worm 70 on shaft 71 carrying a gear 72. The gear 72 meshes with pinion 73 mounted on shaft 74 carrying a hand wheel 75. The shaft 71 at its other end is provided with a gear ratchet 76 and a pawl 77 to prevent rotation of the shaft in one direction. The operation of hand wheel 75 will pull on chain 67 and exert a pull on the floating lever 53 which will effect a braking action to be hereinafter described.

Figure 8:
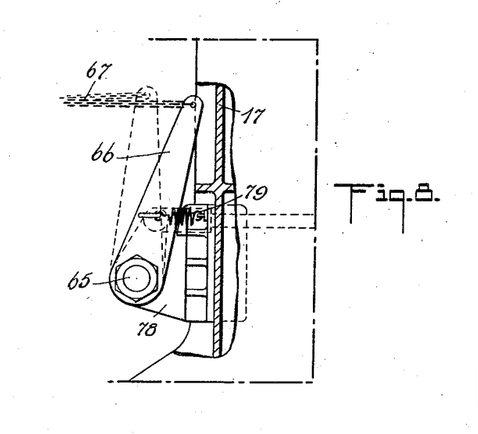
Fig. 8 is a partial plan view with a portion in section illustrating a stop device for one of the operating levers.
Figure 9:
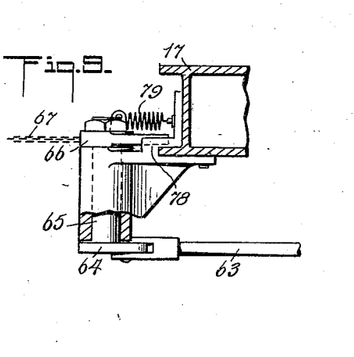
Fig. 9 is a side elevation partly in section of the mechanism shown in Fig. 8.

Referring to Figs. 8 and 9, it will be seen that the normal position of the lever 66 is against a stop on bracket 78, fastened to a portion of the frame of truck bolster 17 and is held in this normal position by a spring 79 and cannot move further toward the truck because of this stop action. Consequently the floating lever 53 cannot have any further movement as a whole to the right, as viewed in Fig. 3, shown herein in full line, but can be moved as a whole to the left when the hand wheel 75 is operated. It is also to be noted that when the air brake mechanism is in the normal position shown in Fig. 3 no further movement as a whole to the left is possible for the floating lever 41, although it can be moved as a whole to the right by the action either of the air brake mechanism or the hand brake wheel 31.

Figures 6, 7:
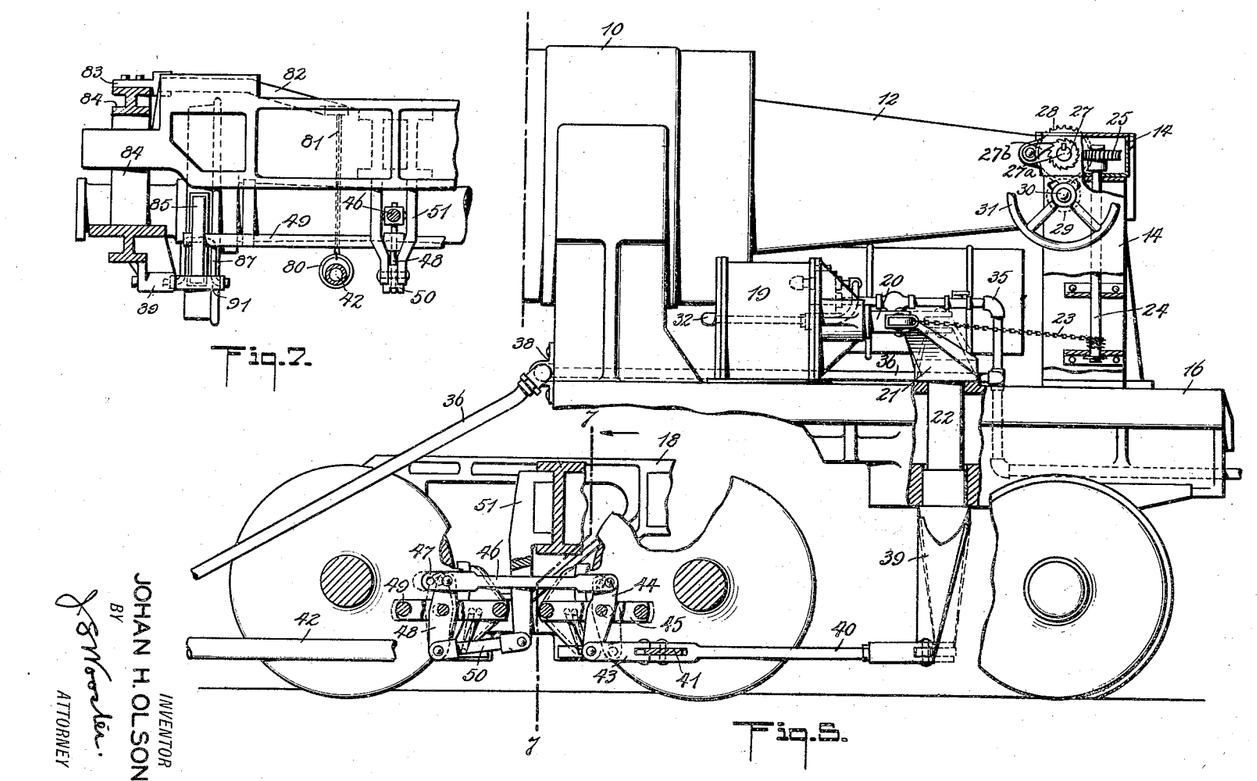
Fig. 6 is an end view of the apparatus as viewed from the right in Fig. 5.
Fig. 7 is a vertical transverse section taken on the line 7—7 of Fig. 5.
Figure 6:
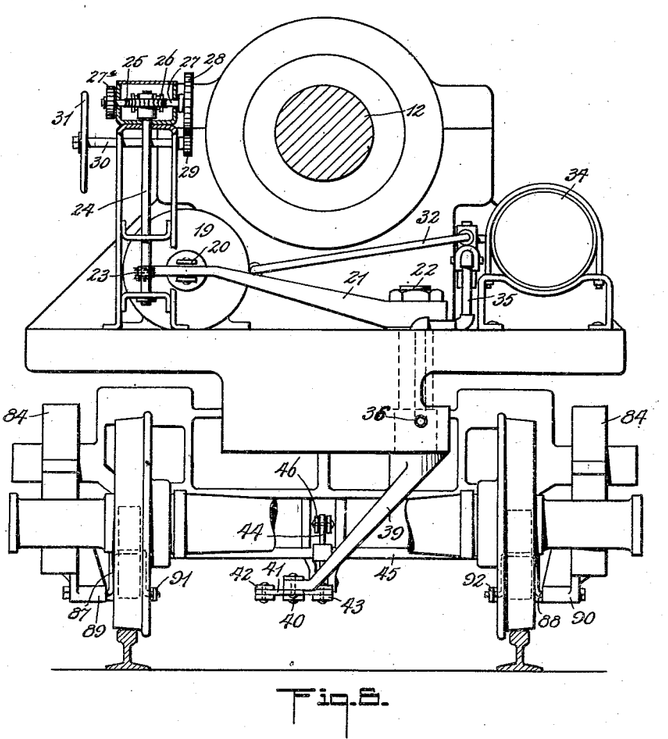

The pull rod 42 is surrounded by a ring 80, see Fig. 7, suspended by a chain 81, connected to a bar 82, pivoted for horizontal motion on a bracket 83, fastened to the side frame 84 of the truck. The brake beams 45, 49, 56 and 59 are similarly anchored to the truck side frames and the manner of supporting one of them will be described and suffice for the description of the support of all of them and with particular reference to Figs. 4, 5 and 7. For instance, the ends of brake beam 49 are provided with brake shoes 85 and 86 fastened thereto. U shaped stirrups 87 and 88 are inserted in the brake heads and are provided with outwardly extending end portions which are pivotally mounted in blocks 89 and 90, supported from the side frames 84 of the truck, as well as in the end plates 91 and 92, extending outwardly from the blocks 89 and 90. These U shaped stirrups provide a pivoted swinging support for the brake shoes and beams which will permit them to be moved horizontally as shown in Fig. 4. This same construction applies to all the brake beams and need not be repeated for the others.

Figure 10:
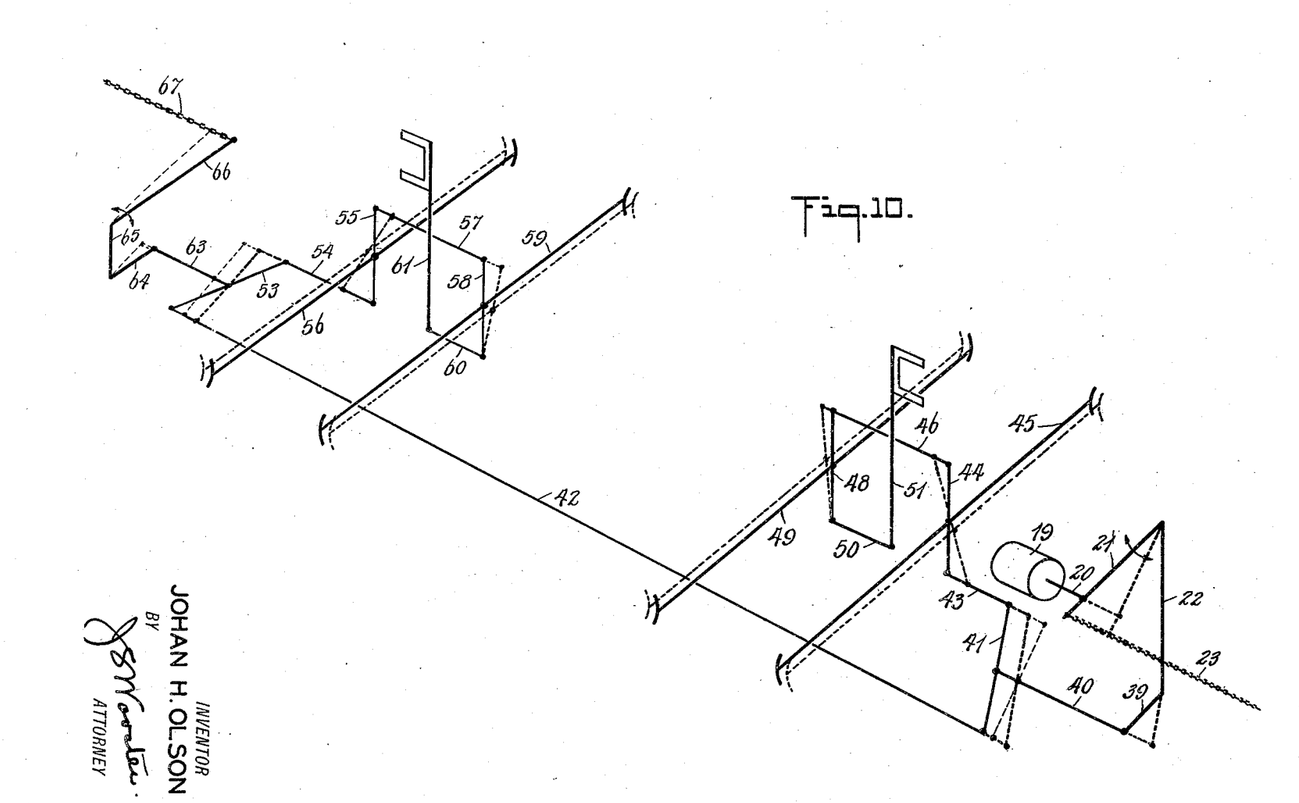
Fig. 10 is a diagrammatic perspective view of the system of levers constituting the braking mechanism.

In the normal action of the apparatus, the brakes are applied by the operation of the air system to force the piston 20 to the right, moving the lever 21, shaft 22 and arm 39. This moves rod 40 to the right and transfers the fulcrum of floating lever 41 to the right, for instance, to the position shown in dotted lines in Fig. 4 and in the diagram in Fig. 10. Through link 43, rocker arm 44, strut 46, rocker arm 48 and link 50 the brake beams 45 and 49 are actuated. At the same time, pull rod 42 is moved to the right and exerts a pull on floating lever 53, turning it around its fulcrum and consequently moving link 54, rocker arm 55, strut 57, rocker arm 58 and link 60 so that the brake beams 56 and 59 are actuated. It is noted at this point that when the fulcrum of the floating lever 41 is moved to the right, the floating lever 53 only has a pivotal movement because the lever 66 is prevented from any further right-hand movement by reason of the stop on bracket 78. If when the air brake mechanism is in the position shown in dotted lines in Fig. 4, and in the diagram in Fig. 10, the piston of the brake cylinder is at its extreme right-hand travel, it is evident that the hand brake mechanism operated through the chain 23 will not be able to apply any additional pressure on the brake shoes if in this position of the mechanism they happen to be not fully applied due to having been worn away. Therefore, as far as this end of the car is concerned, the brakes cannot be more effectively applied. However, by exerting a pull on chain 67 at the other end of the car, the lever 66 can be moved to the left and through the system of levers and rods connected thereto, will move the fulcrum of floating lever 53 to the left, thus applying additional pressure to brake beams 56 and 59 and through the pull rod 42 causing a pivotal movement of the floating lever 41, whereby additional pressure is applied to the brake beams 45 and 49. Consequently by providing the two floating levers with their associated system of linkages connected to the braking elements and to the operating elements, in the manner shown, I am enabled while the car is in motion to further apply the brakes even though one operating element has been set to its limit.

It will be seen from the above description that there are horizontal as well as vertical pivots between the ends of the pull rod 42 and the respective brake beams 45, 49, and 56, 59. For example, the horizontal pivot between the pull rod and the brake beam 45 is the point where the pull rod is connected to the floating lever 41, while the vertical pivot is the point where the link 43 is connected to the vertical rocker arm 44. Consequently, when the two trucks turn in negotiating a curve, the pull rod 42 will swing on its horizontal pivots and freely accommodate itself to this movement of the trucks, but since the floating levers 41 and 53 are located in the horizontal centers of the respective trucks the brakes will never tighten but on the contrary will ease slightly when rounding a curve.

When I say that the floating levers 41 and 53 are located at the center of the respective trucks, I mean the approximate centers of said trucks. Of course, since the fulcra of these levers are movable, and since the levers are also adapted to pivot about their fulcra, no given point on either lever will always remain in the exact center of its truck. The central areas of the two trucks, however, will always remain substantially the same distance apart no matter how the trucks may turn in rounding a curve.

I claim:

1. A braking mechanism comprising a pair of floating levers of the first class, operating means connected to the fulcra of said levers, means for preventing the movement of the fulcra in given direction and a pull rod connected between corresponding ends of said levers, said pull rod having a length greater than the distance between the fulcra.

2. A braking mechanism comprising a pair of floating levers of the first class, operating means connected to the fulcra of said levers, means for preventing the movement of the fulcra in given direction and a pull rod connected between corresponding ends of said levers, said pull rod having a length greater than the distance between the fulcra and braking elements connected to the opposite ends of said levers.

3. A braking mechanism comprising a pair of floating levers of the first class, braking elements connected to corresponding ends of said levers, a pull rod connected to the opposite ends of said levers and having a length greater than the distance between the fulcra of said levers, operating mechanism connected to the fulcra of said levers and adapted to move said fulcra away from each other and means for preventing the movement of the fulcra toward each other from given normal positions thereof.

4. A braking mechanism for cars comprising a system of levers, brake beams from which said system is pivotally suspended, pivotal means to suspend the beams from the trucks, said system comprising a pair of horizontal floating levers, a pull rod connecting said floating levers, and a flexible pivoted means connected to the truck and supporting said pull rod.

5. A braking mechanism comprising a plurality of horizontal floating levers, a separate operating member fulcrumed to an intermediate portion of each lever, a braking element connected to one end of each lever, a rod pivoted to and connecting the other ends of said levers, means for independently shifting the fulcrum of each lever in one direction to actuate its associated braking element and said connecting rod, and means for limiting the movement of the fulcra in the opposite direction to permit the levers to be pivoted in response to the actuation of said connecting rod.

6. A braking mechanism comprising a pair of horizontal floating levers, separate operating members fulcrumed to an intermediate portion of each lever, separate braking elements connected to one end of each lever, independent means connected to each of said operating members for shifting the fulcrum of its associated lever to actuate the braking element controlled thereby, and means responsive to such movement of one lever to pivot the other lever upon its fulcrum to actuate its associated braking element.

7. A braking mechanism for cars comprising a pair of horizontal floating levers, an actuating rod fulcrumed to an intermediate portion of one lever, a second actuating rod fulcrumed to an intermediate portion of the other lever, a braking element connected to one end of one lever, a second braking element connected to the corresponding end of the other lever, a pull rod pivotally connecting the other ends of said levers, means for moving one of said actuating rods to shift the fulcrum of the associated lever and thereby actuate the associated braking element and said pull rod, means for preventing the fulcrum of the second lever from shifting in response to the actuation of said pull rod thereby permitting said lever to pivot on its fulcrum to actuate its associated braking element, and means for independently shifting the fulcrum of said second lever in a direction to further actuate its associated braking element and said pull rod and thereby cause said first lever to pivot on its fulcrum to further actuate its associated braking element.

8. A braking mechanism comprising a pair of horizontal floating levers, brakes connected to one end of each lever, means for independently moving the fulcra of the respective levers into limiting position to set the brakes connected thereto, and means responsive to such movement of either lever to pivot the other lever about its fulcrum to further apply the brakes connected thereto.

9. A breaking mechanism comprising a pair of horizontal floating levers each being fulcrumed intermediate the ends thereof, brakes connected to one end of each lever, means for moving the fulcrum of one lever in a direction to set the brakes connected thereto, means responsive to such movement to pivot the second lever about its fulcrum in a direction to set the brakes connected thereto, means for moving the fulcrum of the second lever in the opposite direction to set the brakes connected thereto independently of its previous operative condition, and means responsive to such movement of the second lever to pivot the first lever about its fulcrum to set the brakes connected thereto independently of its previous operative condition.

10. A braking mechanism comprising a pair of horizontal floating levers, brakes connected to one end of each lever, operating members connected to the fulcra of said levers, means connected to each of said operating members to move the fulcra of the respective levers in a direction to set the brakes connected thereto, and means responsive to such movement of either lever to pivot the other lever about its fulcrum in a direction to further apply the brakes connected thereto.

11. A braking mechanism comprising a pair of horizontal floating levers, operating members connected to the fulcra of said levers, brakes connected to one end of each lever, means connecting the other ends of said levers and responsive to the movement of the fulcrum of either lever to pivot the other lever about its fulcrum, air brake mechanisms connected to one of said operating members, and hand brake mechanisms connected to each of said operating members.

12. A braking mechanism comprising a pair of horizontal floating levers, brakes connected to one end of each lever, operating members connected to the fulcra of said levers, independent hand and air operated mechanisms connected to one of said operating members to move the fulcrum of the associated lever in a direction to set the brakes connected thereto, means connected to the second operating member to move the fulcrum of the second lever in a direction to set the brakes connected thereto, and means responsive to such movement of either lever to pivot the other lever about its fulcrum in a direction to apply the brakes connected thereto regardless of their previous operative condition.

13. The combination with a car having separate trucks, of a braking mechanism including a horizontal floating lever carried by each truck, brakes connected to one end of each lever, means for independently moving the fulcra of the respective levers to actuate the brakes connected thereto, and means responsive to such movement of either lever to pivot the other lever upon its fulcrum to actuate the brakes connected thereto.

14. The combination with a car having separate trucks, of a braking mechanism including a horizontal floating lever carried by each truck, brakes connected to one end of each lever, means for independently moving the fulcra of the respective levers into limiting position to set the brakes connected thereto, and means responsive to such movement of either lever to pivot the other lever upon its fulcrum to further apply the brakes connected thereto.

15. The combination with a car having separate trucks, of a braking mechanism comprising a floating lever located at the center of one truck, a second floating lever located at the center of the other truck, brakes connected to one end of each lever, means for independently moving the fulcra of the respective levers to apply the brakes connected thereto, and a pull rod pivoted horizontally to the other ends of said levers and responsive to the aforesaid movement of either lever to pivot the other lever upon its fulcrum.

16. The combination with a car having separate trucks, of a braking mechanism comprising a horizontal floating lever located at the center of one truck, a second horizontal floating lever located at the center of the other truck, brakes connected to one end of each lever, a pull rod pivoted to and connecting the other ends of said levers, means for independently shifting the fulcrum of each lever in one direction to actuate its associated brakes and said pull rod, and means for limiting the movement of the fulcra in the opposite direction to permit the levers to be pivoted in response to the actuation of said connecting rod.

17. The combination with a car having separate trucks, of a braking mechanism comprising a horizontal floating lever located at the center of one truck, a second horizontal floating lever located at the center of the other truck, brakes connected to corresponding ends of each lever, means for independently moving the fulcra of the respective levers to apply the brakes connected thereto, and a pull rod pivoted to and connecting the other ends of said levers, said pull rod having a length greater than the distance between the fulcra of said levers.

18. The combination with a car having separate trucks, of a braking mechanism comprising a horizontal floating lever located at the horizontal center of one truck, a second horizontal floating lever located at the horizontal center of the other truck, an actuating rod fulcrumed to an intermediate portion of one lever, a second actuating rod fulcrumed to an intermediate portion of the other lever, a braking element connected to one end of one lever, a second braking element connected to the corresponding end of the other end, a pull rod pivotally connecting the other ends of said levers, means for moving one of said actuating rods to shift the fulcrum of the associated lever and thereby actuate the associated braking element and said pull rod, means for preventing the fulcrum of the second lever from shifting in response to the actuation of said pull rod thereby permitting said lever to pivot on its fulcrum to actuate its associated braking element, and means for independently shifting the fulcrum of said second lever in a direction to further actuate its associated braking element and said pull rod and thereby cause said first lever to pivot on its fulcrum to further actuate its associated braking element.

19. The combination in a hot metal car of a horizontal hot metal dumping body having an enlarged intermediate vertical cross-section and elongated end trunnions, trucks at each end of the car having bearings supporting said trunnions, a braking mechanism comprising a pair of floating levers located at the centers of the respective trucks, brakes connected to one end of each lever, means at each end of the car for independently moving the fulcra of the respective levers to apply the brakes connected thereto, and a pull rod pivoted to and connecting the other ends of said levers and responsive to the aforesaid movement of either lever to pivot the other lever upon its fulcrum.

Signed at New York, in the county of New York, and State of New York, this 21st day of October, A. D. 1927.

JOHAN HJALMAR OLSON.